(12) United States Patent
Zheng et al.

(10) Patent No.: US 10,190,939 B2
(45) Date of Patent: Jan. 29, 2019

(54) METHOD AND APPARATUS FOR PERFORMING INTERRELATION PROFILE ANALYSIS

(71) Applicant: AFL TELECOMMUNICATIONS LLC, Duncan, SC (US)

(72) Inventors: Wenxin Zheng, Moore, SC (US); Hiroshi Sugawara, Greenville, SC (US); Bryan Malinsky, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 530 days.

(21) Appl. No.: 14/466,533

(22) Filed: Aug. 22, 2014

(65) Prior Publication Data

US 2016/0054197 A1 Feb. 25, 2016

Related U.S. Application Data

(63) Continuation of application No. 14/235,942, filed as application No. PCT/US2012/048826 on Jul. 30, 2012, now abandoned.

(60) Provisional application No. 61/513,036, filed on Jul. 29, 2011.

(51) Int. Cl.
| | |
|---|---|
| *G02B 6/024* | (2006.01) |
| *G01M 11/00* | (2006.01) |
| *G02B 6/255* | (2006.01) |
| *G01B 11/27* | (2006.01) |
| *G06T 7/73* | (2017.01) |

(52) U.S. Cl.
CPC ........... *G01M 11/30* (2013.01); *G01B 11/272* (2013.01); *G02B 6/024* (2013.01); *G02B 6/2555* (2013.01); *G06T 7/73* (2017.01); *G06T 2207/10004* (2013.01); *G06T 2207/20048* (2013.01)

(58) Field of Classification Search
CPC ..... G01M 11/30; G02B 6/024; G02B 6/2555; G06T 7/73; G06T 2207/10004; G06T 2207/20048; G01B 11/272
See application file for complete search history.

(56) References Cited

U.S. PATENT DOCUMENTS

| | | | |
|---|---|---|---|
| 5,559,601 | A | 9/1996 | Gallatin et al. |
| 7,403,673 | B2 | 7/2008 | Caron et al. |
| 2010/0209049 | A1 | 8/2010 | Zheng et al. |

FOREIGN PATENT DOCUMENTS

WO   WO 2013019716 A2 *  2/2013   ............. G02B 6/024

OTHER PUBLICATIONS

Malinsky et al., WO 2013/019716 A2, Feb. 7, 2013, 26 pp.*

(Continued)

*Primary Examiner* — Toan Le
(74) *Attorney, Agent, or Firm* — Dority & Manning, P.A.

(57) ABSTRACT

A method of analyzing a polarization-maintaining (PM) optical fiber includes illuminating a side of the PM optical fiber, physically rotating the PM optical fiber and measuring light intensity of light transmitted through the PM optical fiber to obtain an image profile, mathematically shifting the image profile at incremental rotation angles, expanding the image profile at each rotational angle into a Fourier series profile, and determining points of symmetry of the PM optical fiber based on the Fourier series profiles.

6 Claims, 7 Drawing Sheets

(56) References Cited

OTHER PUBLICATIONS

Wenxin Zheng, Auto-Aligning and Splicing PM-Fibers of Different Types with a Passive Method, Nov. 12, 1996, Proc. SPIE 2837, Fiber Optic Gyros: 20th Anniversay Conference, pp. 356-367.*
Zheng et al., Interrelation Profile Analysis Method for Alignment of Polarization-Maintaining Fiber, May 18, 2010, Optical Fiber Communication (OFC), collocated National Fiber Optic Engineers Conference, 2010 Conference on (OFC/NFOEC), 3 pp.*
Zheng et al. Abstract, May 18, 2010, 7 pp.*
M.B. El Mashade et al., "Analysis of Ultra-Short Pulses Propagation in Nonlinear Optical Fiber", Progress in Electromagnetics Research B, 2009, pp. 219-241, vol. 12.
International Search Report for PCT/US2012/048826 dated Oct. 16, 2012 [PCT/ISA/210].

\* cited by examiner

TEST RESULTS WITH FOURIER ANALYSIS METHOD

| FIBER COMBINATIONS | SPLICE SAMPLES | AVERAGE ANGLE ERROR (DEG) | | | STD OF ANGLE ERROR (DEG) | | |
|---|---|---|---|---|---|---|---|
| | | DIRECT CORRELATION | INDIRECT CORRELATION | FOURIER ANALYSIS | DIRECT CORRELATION | INDIRECT CORRELATION | FOURIER ANALYSIS |
| 80um PANDA A + 80um PANDA A | 8 | 1.73 | 1.14 | 0.91 | 1.20 | 1.13 | 0.85 |
| 80um BOWTIE A + 80um BOWTIE A | 17 | 3.44 | 4.50 | 1.37 | 2.61 | 3.99 | 1.44 |
| 80um PANDA A + 80um PANDA B | 12 | 1.36 | 4.26 | 1.30 | 1.40 | 1.96 | 0.60 |
| 80um PANDA B + 80um ELLIPTIC CORE B | 12 | 1.22 | 1.79 | 1.83 | 1.12 | 1.27 | 1.32 |
| 125um PANDA A + 125um PANDA A 980 nm | 19 | 1.30 | 1.07 | 0.91 | 0.83 | 0.98 | 0.75 |
| 125um PANDA A + 125um PANDA A 1550 nm | 5 | 0.76 | 0.48 | 0.35 | 0.16 | 0.20 | 0.29 |
| 125um BOWTIE A + 125um BOWTIE A | 15 | 0.94 | 0.50 | 0.39 | 0.71 | 0.35 | 0.41 |
| PANDA B Yb + DOUBLE CLAD PANDA | 49 | 1.03 | 0.85 | 1.03 | 0.81 | 0.67 | 0.74 |
| 125um PANDA A + 125um PANDA B | 80 | 2.81 | 2.31 | 1.34 | 1.92 | 1.41 | 0.99 |
| 125um BOWTIE A + 125um PANDA A | 20 | N/A | 0.90 | 0.93 | N/A | 0.63 | 0.56 |
| INDEX MATCHING PANDA + PANDA YDF | 12 | 0.88 | 0.78 | 0.42 | 0.58 | 0.59 | 0.23 |
| 125um PANDA C + 125um PANDA C | 14 | 1.15 | 0.58 | 0.31 | 1.07 | 0.65 | 0.31 |
| TOTAL / AVERAGE | 263 | 1.84 | 1.71 | 1.06 | 1.72 | 1.85 | 0.92 |

FIG. 8

METHOD AND APPARATUS FOR PERFORMING INTERRELATION PROFILE ANALYSIS

CROSS-REFERENCE TO RELATED APPLICATION

This application is a Continuation of the U.S. patent application Ser. No. 14/235,942 filed Jan. 29, 2014; which is based off of PCT/US2012/048826 filed Jul. 30, 2012 and claims the benefit of U.S. Provisional Application No. 61/513,036, filed on Jul. 29, 2011 in the United States Patent and Trademark Office, the disclosure of which is herein incorporated by reference in its entirety.

BACKGROUND

1. Field

Methods and apparatuses consistent with exemplary embodiments relate to aligning a polarization-maintaining optical fiber, and more particularly, to aligning a polarization-maintaining optical fiber using a Fourier series.

2. Description of the Related Art

Figure 1A:
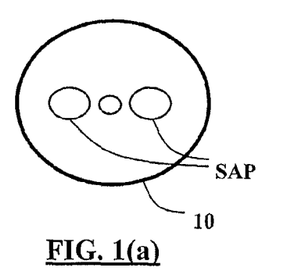
FIG. 1(a) shows a cross-section of a Panda fiber.
Figure 1B:
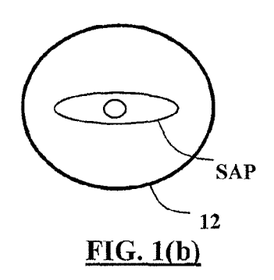
FIG. 1(b) shows a cross-section of an elliptical-clad fiber.
Figure 1C:
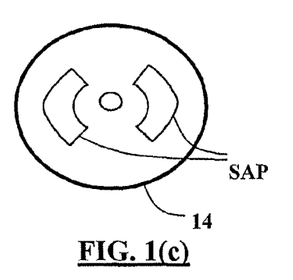
FIG. 1(c) shows a cross-section of a bow-tie fiber.
Figure 2A:
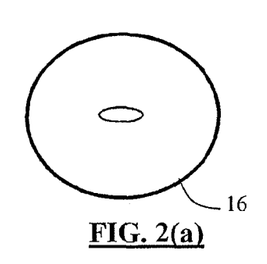
FIG. 2(a) shows a cross-section of an elliptic-core fiber produced by modified chemical vapor deposition (MCVD)
Figure 2B:
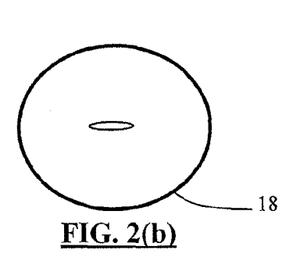
FIG. 2(b) shows a cross-section of an elliptic-core fiber produced by outside vapor deposition (OVD)

Polarization-maintaining (PM) optical fibers are widely used for many types of photonic assemblies. A PM optical fiber is a type of optical fiber in which the polarization of linearly-polarized light is maintained during propagation of the light through the optical fiber. One type of PM optical fiber induces stress in the core by using a cladding with a non-circular cross-section or rods of another material within the cladding. For example, FIG. 1(a) shows a cross-section of a Panda fiber 10, FIG. 1(b) shows a cross-section of an elliptical-clad fiber 12, and FIG. 1(c) shows a cross-section of a bow-tie fiber 14. Each of the optical fibers shown in FIGS. 1(a)-1(c) includes a stress-applying part (SAP) within the cladding. Another type of PM optical fiber uses the non-circular geometry of the core to maintain the polarization of the light transmitted therethrough. For example, FIG. 2(a) shows a cross-section of an elliptic-core fiber 16 produced by modified chemical vapor deposition (MCVD), and FIG. 2(b) shows a cross-section of an elliptic-core fiber 18 produced by outside vapor deposition (OVD).

PM optical fibers, like other types of fibers, are aligned and spliced together to enable communication over long distances. Fully automatic alignment and splicing has been possible for most PM fibers by using existing methods. However, each of the currently existing methods has limitations and drawbacks. Furthermore, there has been a proliferation of new specialized PM fibers in recent years, which are used for sophisticated sensor and fiber laser applications. These new specialized PM fibers are difficult to align using any of the currently existing methods.

One currently existing method of aligning PM optical fibers is an interrelation profile alignment (IPA) method. In this method, a transverse view of the fiber is used with a focus position intersecting the fiber, similar to the profile alignment system (PAS). At this focus position, there is a great deal of information that can be analyzed in the center region of the brightness intensity profile, as in the case of PAS (and unlike in the case of polarization observation by lens effect (POL), in which only contrast information is obtained). However, unlike PAS, in which the fiber is simply rotated until a certain image is obtained (such as an image in which two brightness features have symmetrical intensity and position), in the IPA method, features are plotted relative to fiber rotational position in a manner similar to the POL plotting of contrast versus rotation angle. More detail on the IPA method is contained in U.S. Patent Application Publication No. 2010/0209049 and the document entitled "Interrelation Profile Analysis Method for Alignment of Polarization-Maintaining Fiber" by Wenxin Zheng, Doug Duke, Toshiki Kubo, and Bryan Malinsky, the contents of which are incorporated herein by reference.

In summary, the current IPA technique includes performing the following operations.

First, IPA profiles are obtained from left and right fibers (fibers to be aligned and spliced together) by rotating the fibers 360 degrees and using image processing software to compute IPA values during the rotation.

Then, angle offsets of the left and right fibers are calculated using linear correlation methods. Two linear correlation methods are commonly employed: the direct correlation method and the indirect correlation method. In the direct correlation method, the left IPA profile is correlated directly with the right IPA profile by rotating IPA data to search for the maximum correlation angle. In the indirect correlation method, the left and right IPA profiles are respectively correlated to a stored IPA profile database.

Then, the left and right fibers are rotated to a desired angle offset based on the calculated angle offsets obtained from the direct or indirect correlation methods, and are spliced together.

Finally, after the left and right fibers are spliced together, the fibers are rotated again and analyzed to confirm that the operation has been successful.

However, the current IPA method suffers from the following weaknesses. First, the direct correlation method only works for similar left and right fibers. Secondly, the indirect correlation method requires preloaded IPA profiles. Third, for unknown PM optical fibers, a polarization extinction ratio (PER) meter is necessary to learn new IPA profiles. Fourth, for asymmetrical PM structures, the current IPA method does not provide a way to make automatic corrections.

SUMMARY

One or more exemplary embodiments may overcome these and/or other problems associated with the related art techniques, by providing an apparatus and method for performing an interrelation profile analysis, which can be flexibly used with a variety of different types of PM optical fibers. Also, exemplary embodiments described herein are not required to overcome the disadvantages described above, and an exemplary embodiment may not overcome any of the problems described above.

Apparatuses and methods according to one or more exemplary embodiments may not require preloaded IPA profiles, may not require a significant amount of time when performing coating clamping, and may not require a PER meter to learn new IPA profiles.

One or more exemplary embodiments may enable automatic corrections to be made for asymmetrical PM structures.

A method of analyzing a polarization-maintaining (PM) optical fiber includes illuminating a side of the PM optical fiber, physically rotating the PM optical fiber and measuring light intensity of light transmitted through the PM optical fiber to obtain an image profile, mathematically shifting the image profile at incremental rotation angles, expanding the image profile at each rotational angle into a Fourier series profile, and determining points of symmetry of the PM optical fiber based on the Fourier series profiles.

An interrelation profile analysis (IPA) apparatus configured to analyze a polarization-maintaining (PM) optical fiber includes a light source configured to emit light towards a PM optical fiber, a fiber rotating unit configured to physically rotate the PM optical fiber, a light receiving unit configured to receive the light passing through the PM optical fiber, and an IPA profile calculating unit configured to obtain an image profile of the PM optical fiber based on light intensity of the received light, mathematically shift the image profile at incremental rotation angles, expand the image profile at each rotational angle into a Fourier series profile, and determine points of symmetry of the PM optical fiber based on the Fourier series profiles.

BRIEF DESCRIPTION OF THE DRAWINGS

The above and/or other exemplary aspects and advantages will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings. These embodiments are provided so that this disclosure will be thorough and complete, and will fully convey the concept of the invention to those skilled in the art. However, the exemplary embodiments should not be construed as being limiting. In the drawings, like reference numerals denote like elements, and the thicknesses of layers and regions may be exaggerated for clarity and convenience.

According to an exemplary embodiment, a method for aligning a polarization-maintaining (PM) optical fiber is provided. The method for aligning a PM optical fiber involves using a Fourier series expansion to generate IPA profiles. The inventors of the present application recognized that, for most PM optical fibers, the PM optical fiber will have 2 symmetric axes. Thus, the IPA profile for such a PM optical fiber should be symmetrical at both 90 degrees and 180 degrees. Furthermore, the IPA profile is a periodical function, and all periodic functions can be approximated by a Fourier series.

Figure 3:
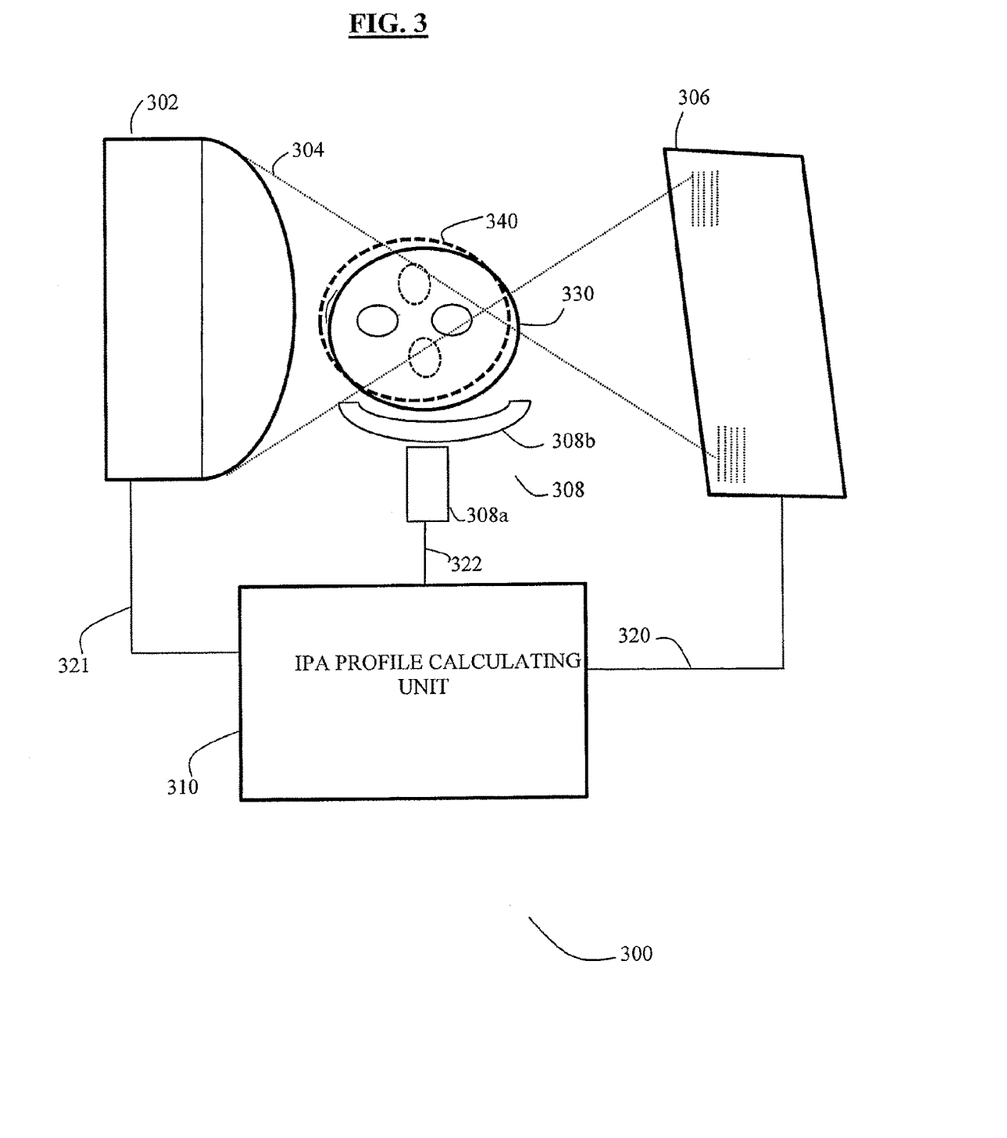
FIG. 3 shows an interrelation profile analysis (IPA) apparatus, according to an exemplary embodiment.

FIG. 3 shows an interrelation profile analysis (IPA) apparatus 300, according to an exemplary embodiment. The IPA apparatus 300 can be implemented as many different types, such as an FSM-100P splicer or an FSM-100P+ splicer manufactured by Fujikura. As shown in FIG. 3, the IPA apparatus 300 includes a light source 302 which irradiates light 304, a light receiving unit 306, a fiber rotating unit 308 configured to rotate left and right PM optical fibers 330 and 340, an IPA profile calculating unit 310, a first link 320 connecting the light receiving unit 306 and the IPA profile calculating unit 310, a second link 321 connecting the light source 302 and the IPA profile calculating unit 310, and a third link connecting the fiber rotating unit 308 and the IPA profile calculating unit 310.

The light source 302 emits light 304 towards the left and right PM optical fibers 330 and 340 to generate an IPA profile (also referred to as an image profile) of each of the left and right PM optical fibers 330 and 340. The light source 302 can be, for example, a light-emitting diode (LED), an incandescent bulb, or another type of light source known to those of skill in the art.

The light receiving unit 306 receives the light 304 which is transmitted through the left and right PM optical fibers 330 and 340. The light receiving unit 306 can be, for example, a complementary metal-oxide semiconductor (CMOS) digital camera sensor, a charge-coupled device (CCD) digital camera sensor, or any other type of light receiving unit known to those of skill in the art.

The fiber rotating unit 308 rotates the left and right PM optical fibers 330 and 340 so that an IPA profile can be obtained over a range of rotational angles for each of the left and right PM optical fibers 330 and 340. The fiber rotating unit 308 includes a base 308a and a rotatable member 308b connected to the base 308a. The rotatable member 308b attaches to and rotates the left and right PM optical fibers 330 and 340. The rotatable member 308b may rotate each of the left and right PM optical fibers 330 and 340 one at a time, to obtain an individual IPA profile of the rotated PM optical fiber. The fiber rotating unit 308 may be implemented according to any of many different designs known to those of skill in the art.

Figure 4:
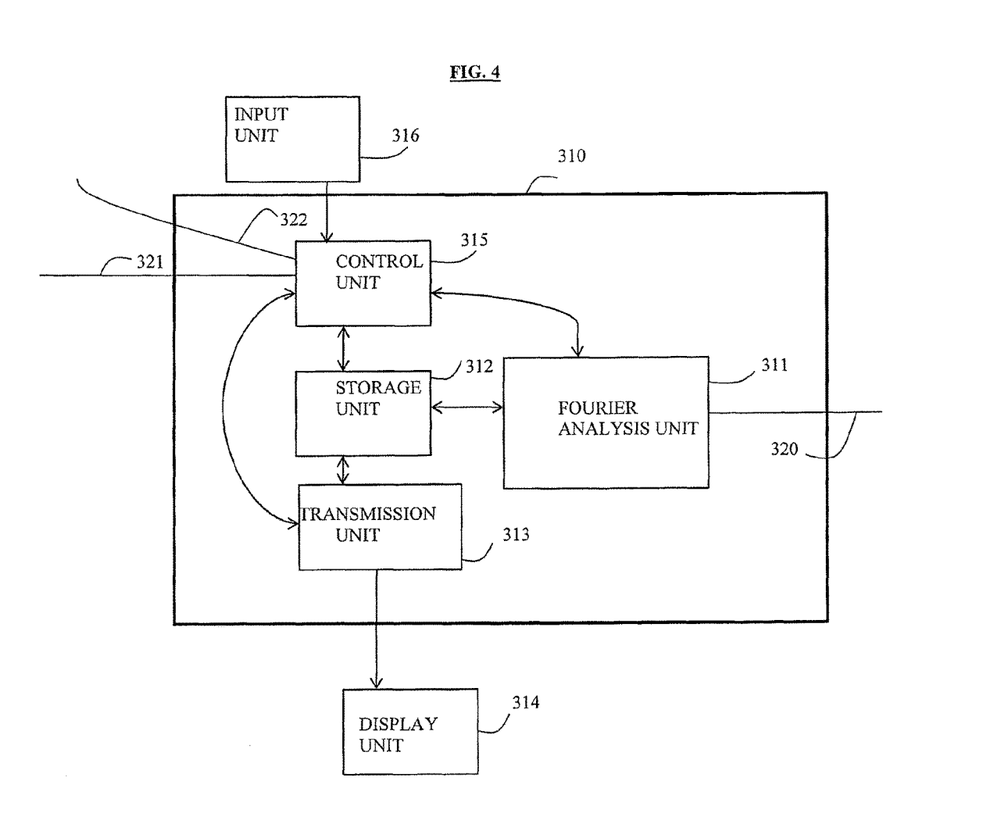
FIG. 4 shows a detailed illustration of the IPA profile calculating unit shown in FIG. 3.

The IPA profile calculating unit 310 calculates an IPA profile of the left and right PM optical fibers 330 and 340. As shown in FIG. 4, the IPA profile calculating unit includes a Fourier analysis unit 311, a storage unit 312, a transmission unit 313, a display unit 314, a control unit 315, and an input unit 316.

Figure 5A:
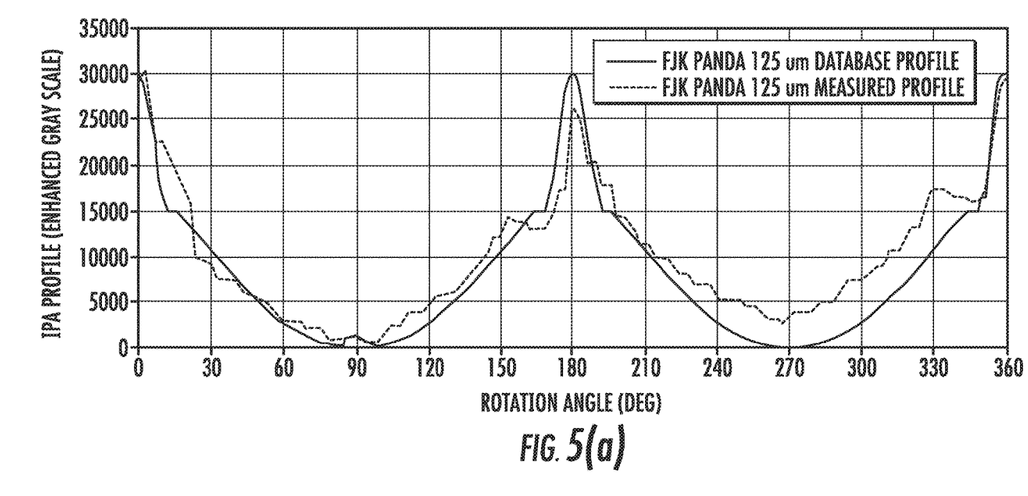
FIG. 5(a) shows a relationship between a rotation angle and an IPA profile of a polarization-maintaining (PM) optical fiber.

The Fourier analysis unit 311 uses a Fourier series expansion to generate Fourier series IPA profiles (also referred to as Fourier series profiles). A more detailed description of the operations of the Fourier analysis unit 311 is provided below with reference to FIG. 5.

The storage unit 312 stores the Fourier series IPA profiles generated by the Fourier analysis unit 311. The storage unit 312 can be, for example, a memory unit, such as a RAM, a ROM, etc.

The transmission unit 313 transmits the Fourier series IPA profiles to the display unit 314. The transmission unit 313 may also transmit the Fourier series IPA profile to another electronic device using wired or wireless connections.

The display unit 314 displays the Fourier series IPA profiles, or information related to the Fourier series IPA profiles, on a screen for a user. The display unit 314 can be, for example, an LCD screen, etc.

The control unit 315 controls the Fourier analysis unit 311, storage unit 312, transmission unit 313, display unit 314, light source 302, light receiving unit 306, and/or fiber rotating unit 308. The control unit 315 can be, for example, an integrated circuit (IC). The control unit 315 is connected to the light source 302 by the link 321, connected to the light receiving unit 306 by the link 320, and connected to the fiber rotating unit 308 by the link 322.

The input unit 316 enables a user to input commands to the control unit 315 to control the overall operations of the IPA apparatus 300. The input unit 316 can be, for example, a keyboard, a graphical user interface (GUI), a mouse, a combination thereof, etc.

FIG. 5(a) shows a relationship between a rotation angle and an IPA profile of a polarization-maintaining (PM) optical fiber, and FIGS. 5(b), 5(c), 5(d), 5(e) and 5(f) show a PM optical fiber rotation in 90° rotation angle increments. In the graph of FIG. 5(a), the y-axis represents the IPA profile (based on light intensity) of the left PM optical fiber 330, and the x-axis represents the rotation angle of the left PM optical fiber 330 as the left PM optical fiber 330 is rotated. The graph of FIG. 5(a) includes two profiles, including a Fujikura Ltd. ("FJK") Panda 125 μm fiber database profile, which has smooth curves, and an FJK Panda 125 μm fiber measured profile, which has rough curves. The FJK Panda 125 μm fiber database profile is obtained from a stored database profile. In contrast, the FJK Panda 125 μm fiber measured profile is obtained by measuring the actual IPA profile values of the left PM optical fiber 330 shown in FIGS. 5(b), 5(c), 5(d), 5(e) and 5(f). Generally, a PM optical fiber will have 2 symmetric axes. Thus, the IPA profile for such a PM optical fiber should be symmetrical at both 90 degrees and 180 degrees, as shown in FIG. 5.

The left PM optical fiber 330 in this example is an FJK Panda 125 μm fiber. The left PM optical fiber 330, as well as many other types of PM optical fibers, has two symmetrical axes, as shown in FIGS. 5(b), 5(c), 5(d), 5(e) and 5(f). Thus, the IPA profile for the left PM optical fiber 330, as well as many other types of PM optical fibers, should be symmetrical at both 90° and 180°.

Figure 5B:
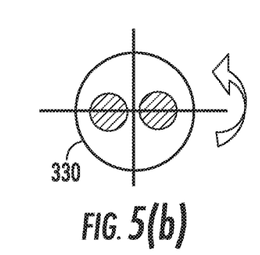
FIGS. 5(b), 5(c), 5(d), 5(e) and 5(f) show a PM optical fiber rotation.

More specifically, in FIG. 5(b), the left PM optical fiber 330 is in a first position. As shown in the graph of FIG. 5(a), in the first position, an IPA profile having a maximum measured value is generated. The maximum measured value in the IPA profile represents a maximum light intensity in the area where the fiber 330 is examined. When the left PM optical fiber 330 is rotated 90° counterclockwise, the left PM optical fiber 330 is moved to a second position shown in FIG. 5(c). As shown in the graph of FIG. 5(a), in the second position, an IPA profile having a minimum measured IPA profile is generated. The minimum measured value in the IPA profile represents a minimum light intensity in the area where the fiber 330 is examined. Then, when the left PM optical fiber 330 is again rotated 90° counterclockwise, the left PM optical fiber 330 is moved to a third position shown in FIG. 5(d). As shown in the graph of FIG. 5(a), in the third position, an IPA profile having a maximum measured IPA profile is generated. Then, when the left PM optical fiber 330 is again rotated 90° counterclockwise, the left PM optical fiber 330 is moved to a fourth position shown in FIG. 5(e). As shown in the graph of FIG. 5(a), in the fourth position, an IPA profile having a minimum measured IPA profile is generated. Finally, when the left PM optical fiber 330 is again rotated 90° counterclockwise, the left PM optical fiber 330 is moved to a fifth position shown in FIG. 5(e). As shown in the graph of FIG. 5(a), in the fifth position, an IPA profile having a maximum measured IPA profile is generated.

Figure 5C:
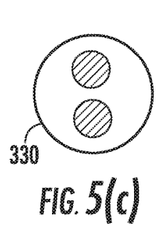
Figure 5D:
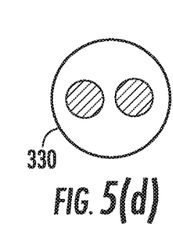
Figure 5E:
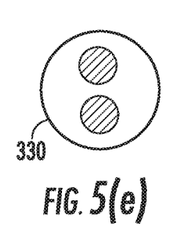
Figure 5F:
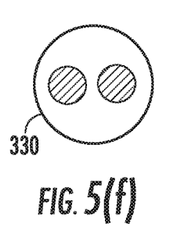

Due to the symmetric axes of the left PM optical fiber 330, the measured IPA profiles for the left PM optical fiber 330 is approximately the same in both the second position (FIG. 5(c)) and the fourth position (FIG. 5(e)), when the left PM optical fiber 330 is rotated 90° counterclockwise from the first position and 270° counterclockwise from the first position, respectively. Similarly, due to the symmetric axes of the left PM optical fiber 330, the measured IPA profiles for the left PM optical fiber 330 is approximately the same in both the third position (FIG. 5(d)) and the fifth position (FIG. 5(f)), when the left PM optical fiber 330 is rotated 180° counterclockwise from the first position and 360° counterclockwise from the first position, respectively. In other words, the measured IPA profile of the left PM optical fiber 330 has symmetry at 90° (because substantially the same measured IPA profile will be generated at another position, i.e., 270°) and also has symmetry at 180° (because substantially the same measured IPA profile will be generated at another position, i.e., 360°).

The Fourier analysis unit 311 (FIG. 4) generates a Fourier series IPA profile of PM optical fibers based on the characteristic that PM optical fibers are symmetric at both 90° and 180°. The Fourier analysis unit 311 expands an IPA image profile into a Fourier series (Fourier series IPA profile). An example of the Fourier series expansion according to an embodiment is given by equation (1):

$$f(x) \sim \frac{a_0}{2} + \sum_{n=1}^{\infty}(a_n\cos n\omega x + b_n\sin n\omega x) \quad \omega := \frac{2\pi}{T} \quad \text{Equation (1)}$$

$$a_n = \frac{2}{T}\int_0^T f(x)\cos n\omega x\, dx \quad n = 0, 1, 2, \ldots$$

$$b_n = \frac{2}{T}\int_0^T f(x)\sin n\omega x\, dx \quad n = 1, 2, \ldots$$

The IPA profile is a periodical function $f(\theta)$ with a period $T=2\pi$ (360°). All periodical functions can be approximated by a Fourier series. If $f(\theta)$ is symmetric to T/4 (90°), all coefficients $b_n$ will be 0. If $f(\theta)$ is symmetric to T/2 (180°), all odd coefficients $a_n$ and $b_n$ will be 0, where n=1, 3, 5, . . . .

Since most IPA profiles are symmetric at both 90° and 180° (as explained above with respect to FIGS. 5(a)-5(f)), then theoretically, when θ=0, 90, 180, 270, the non-zero coefficients should only be the even terms of $a_n$, where n=0, 2, 4, . . . .

Next, a symmetry search can be performed in the Fourier expansion. To perform this symmetry search, first, a new $f_\delta(\theta)$ is constructed by rotating (i.e., shifting) the measured IPA profile by a value δ, to obtain $f_\delta(\theta)$ (also represented as IPA profile $f(\theta+\delta)$). The value δ can be an incremental rotation angle. Next, $f_\delta(\theta)$ is expanded into a Fourier series, which yields a corresponding set of Fourier coefficients $a_n$ and $b_n$. Next, this process is repeated by sweeping δ from 0° to 360°, and each time this process is performed at a different δ, a corresponding set of Fourier coefficients $a_n$ and $b_n$ is calculated. Furthermore, for each set of Fourier coefficients $a_n$ and $b_n$, a ratio value R and a value $A_{sum}$ can be calculated. A search can then be performed to find the minimum points of R with positive $A_{sum}$ or negative $A_{sum}$ (this minimum point of R with positive $A_{sum}$ also being referred to as "$d_{min}$"). Thus, the phrase "sweeping δ from 0° to 360°" refers to an operation in which the fiber is mathematically rotated 360°. As the fiber is mathematically rotated, the Fourier coefficients $a_n$ and $b_n$, the ratio R, and $A_{sum}$ correspondingly change in value. The location $d_{min}$ is the symmetric location which is being searched for. Equation 2 illustrates how to calculate R and $A_{sum}$:

$$A_{odd} = \sqrt{\sum_{n=0}^{\infty} a_{2n+1}^2}$$

$$A_{even} = \sqrt{\sum_{n=1}^{\infty} a_{2n}^2}$$

$$B_{odd} = \sqrt{\sum_{n=0}^{\infty} b_{2n+1}^2}$$

$$B_{even} = \sqrt{\sum_{n=1}^{\infty} b_{2n}^2}$$

$$A_{sum} = \sum_{n=0}^{\infty} a_n$$

$$R = \frac{(A_{odd} + B_{odd} + B_{even})}{A_{even}}$$

Equation (2)

The minimum value of R indicates a point of symmetry, e.g., 0°, 90°, 180°, and 270°, because as explained above, at these symmetry points, the only approximately non-zero coefficient is $A_{even}$, and $R=(A_{odd}+B_{odd} B_{even})/A_{even}$. Thus, when $A_{even}$ is the only approximately non-zero coefficient, R will be a minimum value. Also, since the value R will be a minimum at each 90° increment, the value R by itself is typically insufficient to distinguish whether a point of symmetry is located, for example, at 0° (e.g., FIG. 5(c)) or 90° (e.g., FIG. 5(d)). To avoid 90° misalignment (angle offset), $A_{sum}$ can be used. $A_{sum}$ is negative at both 90° and 270°, and positive at 0° and 180°. Therefore, to search for the points where the fiber 330 is aligned at either 0° or 180°, the points corresponding to a minimum R and positive $A_{sum}$ should be determined. Alternatively, to search for the points where the fiber 330 is aligned at either 90° or 270°, the points corresponding to a minimum R and negative $A_{sum}$, should be determined.

Figure 6:
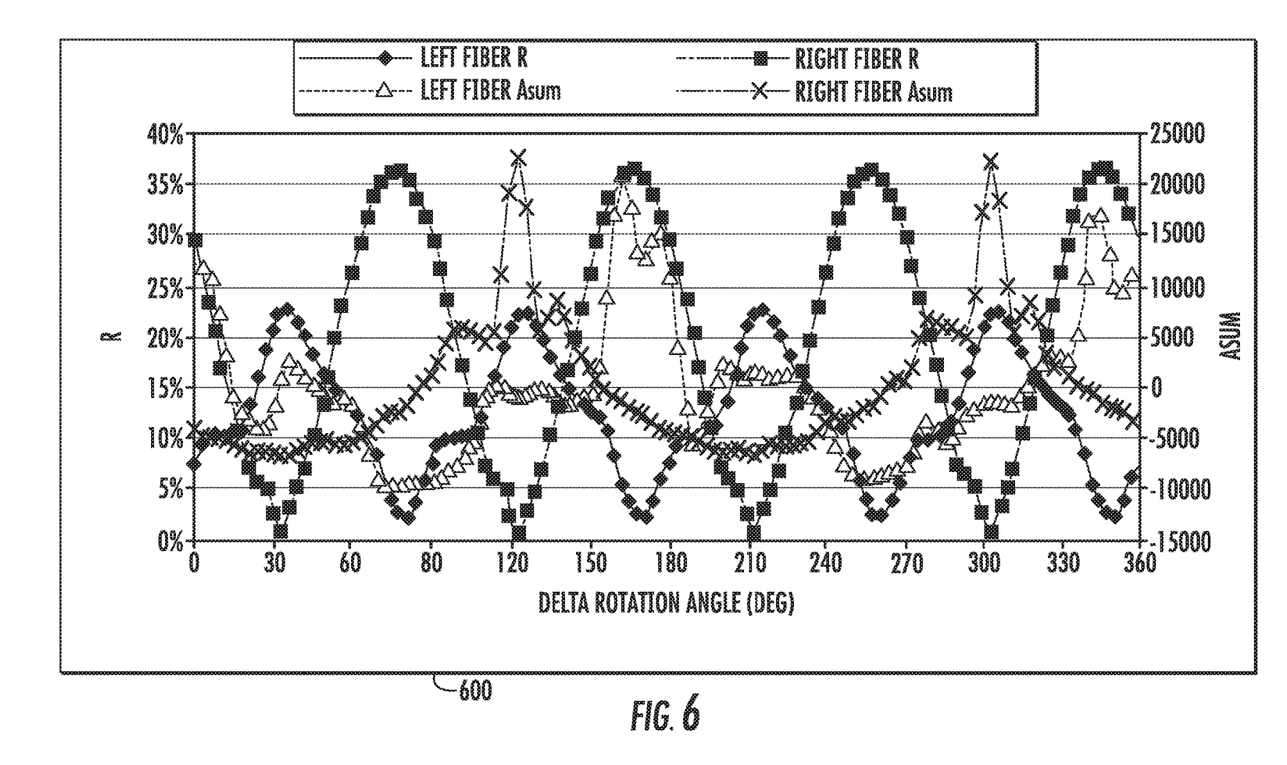
FIG. 6 shows a relationship between a delta rotation angle, R, and Asum, according to an exemplary embodiment.

FIG. 6 shows a relationship between a delta rotation angle, R, and $A_{sum}$, according to an embodiment. As shown in the graph 600 of FIG. 6, a value R and a value $A_{sum}$ are calculated for both a left fiber and a right fiber, at increments of several degrees of rotation, for example, every 3°. The scale for R is shown on the left of FIG. 6, and the scale for $A_{sum}$ is shown on the right of FIG. 6.

The left fiber has minimum R values at four delta rotation angles, namely the delta rotation angles of approximately 80°, 170°, 260°, and 350°. Additionally, of these four delta rotation angles, two rotation angles, namely 170° and 350°, have positive $A_{sum}$ values.

The right fiber has minimum R values at four delta rotation angles, namely the delta rotation angles of approximately 30°, 120°, 210°, and 300°. Additionally, of these four delta rotation angles, two rotation angles, namely 120° and 300°, have positive $A_{sum}$ values.

Using these calculations, the left and right fibers can be aligned. For example, based on the calculations in FIG. 6, the left fiber can be rotated 170° and the right fiber can be rotated 120° to align the left and right fibers and thereby maximize polarization.

Figure 7:
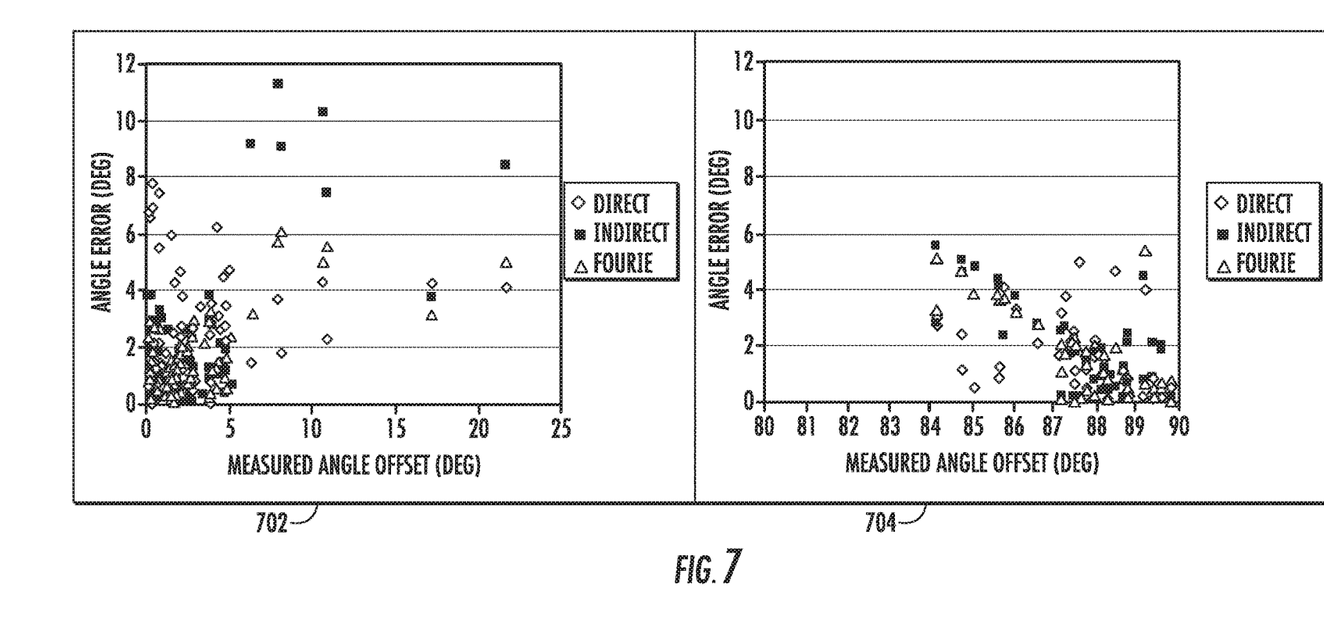
FIG. 7 shows test results for the Fourier analysis method, according to an embodiment.

FIG. 7 shows test results for the Fourier analysis method described above. As shown in the graphs 702 and 704 of FIG. 7, the Fourier analysis method results in a reduced amount of angle error as compared to the direct and indirect correlation methods.

Specifically, as shown in FIG. 7, the Fourier analysis method was compared with direct and indirect correlation methods for 136 splices with many different PM fiber types. The average angle offset compared to the measured angle offset is 1.58°, much lower than the direct correlation method (1.94°) and the indirect correlation method (1.93°). Furthermore, since no IPA profile database is needed, the Fourier analysis method can handle new fiber types without being required to learn new functions, or to use PER measurement equipment. Moreover, for asymmetric fibers, the Fourier analysis method can issue a warning to an operator regarding a PER measurement and input of an adjustment angle.

Figure 8:
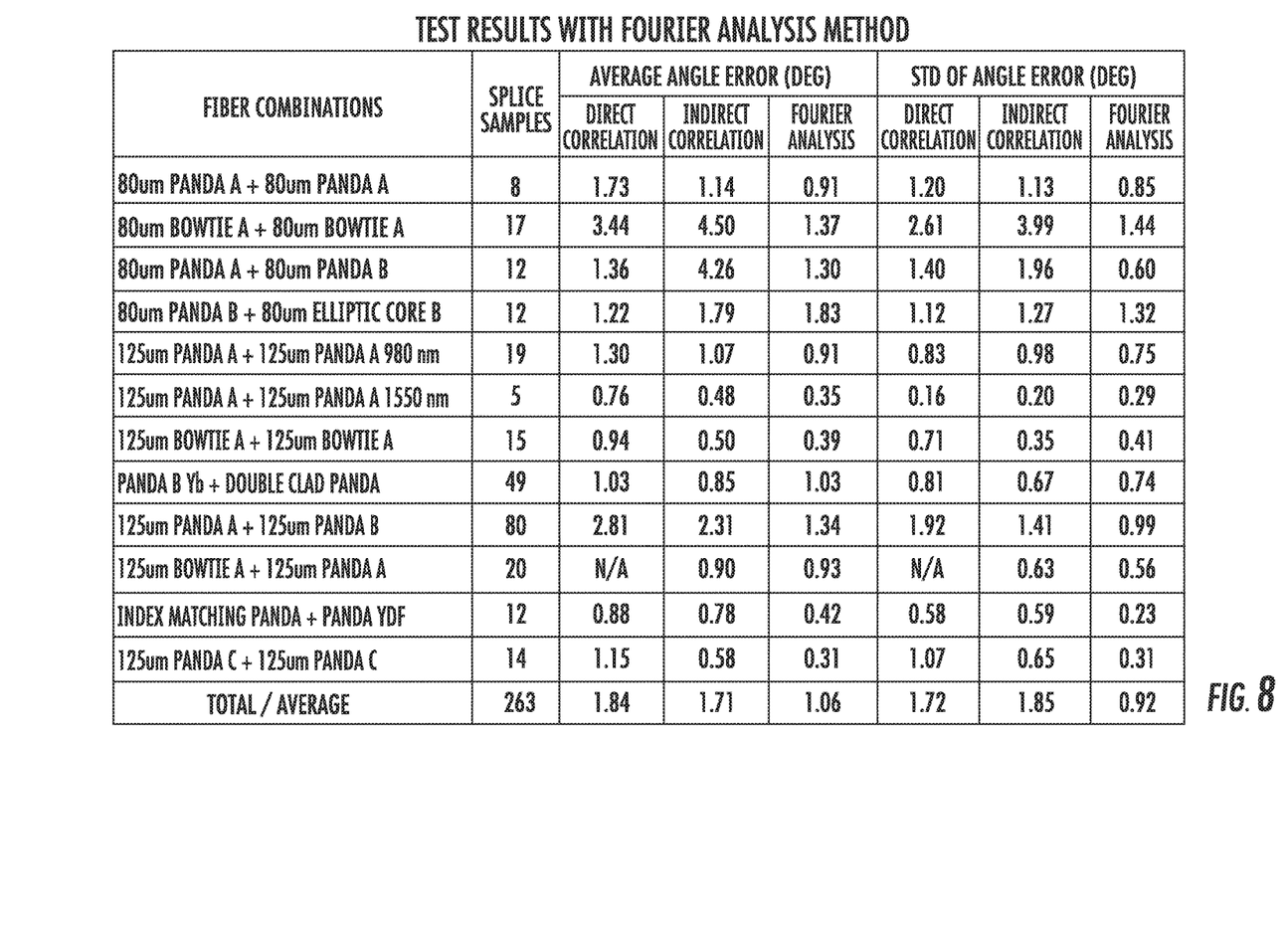
FIG. 8 shows additional test results of the Fourier analysis method.

FIG. 8 shows additional test results of the Fourier analysis method. As shown in FIG. 8, the Fourier analysis method was compared with direct and indirect correlation methods for splices with many different combinations of PM fiber types. The average angle error of the Fourier analysis method was 1.06°, much lower than the direct correlation method (1.84°) and the indirect correlation method (1.71°). Additionally, the standard deviation of angle error for the Fourier analysis method was 0.092, much lower than the direct correlation method (1.72) and the indirect correlation method (1.85).

Thus, according to exemplary embodiments, the Fourier analysis method may achieve superior results in the alignment of PM optical fibers, as compared to the direct and indirect correlation methods.

While aspects of exemplary embodiments have been particularly shown and described, it will be understood by those of ordinary skill in the art that various changes in form and detail may be made therein without departing from the spirit and scope of the inventive concept as defined by the following claims and their legal equivalents.

What is claimed is:

1. A method of analyzing polarization-maintaining (PM) optical fibers, comprising:

illuminating a side of each of a first and second PM optical fiber using light having a focus point intersecting each of the first and second PM optical fibers;

physically rotating each of the first and second PM optical fiber and measuring light intensity of the light transmitted through each of the first and second PM optical fiber to obtain an image profile of each of the first and second PM optical fiber;

mathematically shifting the image profile of each of the first and second PM optical fiber at incremental rotation angles;

expanding the image profile of each of the first and second PM optical fiber at each rotational angle into a Fourier series profile, using the following equations to expand the image profile of each of the first and second PM optical fiber at each rotational angle into the Fourier series profile:

$$f(x) \sim \frac{a_0}{2} + \sum_{n=1}^{\infty} (a_n \cos \omega x + b_n \sin n \omega x) \quad \omega := \frac{2\pi}{T}$$

$$a_n = \frac{2}{T} \int_0^T f(x) \cos \omega x \, dx \quad n = 0, 1, 2, \ldots$$

$$b_n = \frac{2}{T} \int_0^T f(x) \sin \omega x \, dx \quad n = 0, 1, 2, \ldots$$

-continued $$A_{odd} = \sqrt{\sum_{n=0}^{\infty} a_{2n+1}^2}$$

$$A_{even} = \sqrt{\sum_{n=1}^{\infty} a_{2n}^2}$$

$$B_{odd} = \sqrt{\sum_{n=0}^{\infty} b_{2n+1}^2}$$

$$B_{even} = \sqrt{\sum_{n=1}^{\infty} b_{2n}^2}$$

$$A_{sum} = \sum_{n=0}^{\infty} a_n$$

$$R = \frac{(A_{odd} + B_{odd} + B_{even})}{A_{even}};$$

determining points of symmetry of each of the first and second PM optical fiber based on the Fourier series profiles; and aligning the first and second PM optical fibers based on the points of symmetry.

2. The method according to claim 1, wherein the determining of the points of symmetry of each of the first and second PM optical fiber comprises determining minimum points of R with a positive $A_{sum}$ value.

3. The method according to claim 1, wherein the determining of the points of symmetry of each of the first and second PM optical fiber comprises determining minimum points of R with a negative $A_{sum}$ value.

4. An interrelation profile analysis (IPA) apparatus configured to analyze polarization-maintaining (PM) optical fibers, comprising:
   a light source configured to emit light towards each of a first and second PM optical fiber such that the light has a focus point intersecting each of the first and second PM optical fibers;
   a fiber rotating unit configured to physically rotate each of the first and second PM optical fiber;
   a light receiving unit configured to receive the light passing through each of the first and second PM optical fiber; and
   an IPA profile calculating unit configured to obtain an image profile of each of the first and second PM optical fiber based on light intensity of the received light, mathematically shift the image profile of each of the first and second PM optical fiber at incremental rotation angles, expand the image profile of each of the first and second PM optical fiber at each rotational angle into a Fourier series profile, determine points of symmetry of each of the first and second PM optical fiber based on the Fourier series profiles, and align the first and second PM optical fibers based on the points of symmetry;

wherein the IPA profile calculating unit expands the image profile of each of the first and second PM optical fiber at each rotational angle into the Fourier series profile by using the following equations:

$$f(x) \sim \frac{a_0}{2} + \sum_{n=1}^{\infty} (a_n \cos \omega x + b_n \sin \omega x) \quad \omega := \frac{2\pi}{T}$$

$$a_n = \frac{2}{T} \int_0^T f(x) \cos \omega x \, dx \quad n = 0, 1, 2, \ldots$$

$$b_n = \frac{2}{T} \int_0^T f(x) \sin \omega x \, dx \quad n = 0, 1, 2, \ldots$$

$$A_{odd} = \sqrt{\sum_{n=0}^{\infty} a_{2n+1}^2}$$

$$A_{even} = \sqrt{\sum_{n=1}^{\infty} a_{2n}^2}$$

$$B_{odd} = \sqrt{\sum_{n=0}^{\infty} b_{2n+1}^2}$$

$$B_{even} = \sqrt{\sum_{n=1}^{\infty} b_{2n}^2}$$

$$A_{sum} = \sum_{n=0}^{\infty} a_n$$

$$R = \frac{(A_{odd} + B_{odd} + B_{even})}{A_{even}}$$

5. The IPA apparatus according to claim 4, wherein the IPA profile calculating unit determines the points of symmetry of each of the first and second PM optical fiber by determining minimum points of R with a positive $A_{sum}$ value.

6. The IPA apparatus according to claim 5, wherein the IPA profile calculating unit determines the points of symmetry of each of the first and second PM optical fiber by determining minimum points of R with a negative $A_{sum}$ value.

* * * * *